(12) United States Patent
Lee et al.

(10) Patent No.: US 7,616,422 B2
(45) Date of Patent: Nov. 10, 2009

(54) OVER CURRENT PROTECTION CIRCUIT FOR POWER SUPPLIES

(75) Inventors: Tsung-Ming Lee, Nan-Tou (TW);
Yu-Feng Fu, Nan-Tou (TW);
Chin-Liang Pai, Nan-Tou (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 353 days.

(21) Appl. No.: 11/798,194

(22) Filed: May 11, 2007

(65) Prior Publication Data
US 2008/0094770 A1   Apr. 24, 2008

(30) Foreign Application Priority Data
Oct. 24, 2006   (TW) .............................. 95218778 U

(51) Int. Cl.
*H02H 3/00*   (2006.01)
(52) U.S. Cl. .................... 361/94; 361/18; 361/93.1

(58) Field of Classification Search .................. 361/18, 361/89, 93.1, 93.7–93.9, 94, 100; 323/224, 323/282; 363/24, 34, 50
See application file for complete search history.

(56) References Cited

U.S. PATENT DOCUMENTS

| | | | | |
|---|---|---|---|---|
| 6,411,483 B1 * | 6/2002 | Sarles et al. | ................ | 361/93.4 |
| 6,631,064 B2 * | 10/2003 | Schuellein et al. | ......... | 361/93.1 |
| 6,680,837 B1 * | 1/2004 | Buxton | ...................... | 361/93.9 |

* cited by examiner

*Primary Examiner*—Fritz M Fleming
*Assistant Examiner*—Terrence R Willoughby
(74) *Attorney, Agent, or Firm*—Kile Goekjian Reed & McManus PLLC

(57) ABSTRACT

An over current protection circuit provides over current protection (O.C.P) and short current protection (S.C.P) and can selectively operate in auto recover mode or latch off mode by replacing certain elements therein. Hence, the present invention can be designed easily and is cheaper than the prior art.

19 Claims, 5 Drawing Sheets

OVER CURRENT PROTECTION CIRCUIT FOR POWER SUPPLIES

BACKGROUND OF THE INVENTION

1. Field of the Invention

The present invention relates to a power supply, and more particularly to an over current protection circuit for power supplies.

2. Description of the Prior Art

In the current art, electronic power source products, such as a power supply, mounts an over current protection circuit (O.C.P) to avoid breakages caused by users or malfunctioning products.

In order to protect an overloaded circuit, a switching power supply is used. The switching power supply limits its output current to a certain range. However, the switching power supply wastes energy and causes high temperatures when the circuit is over current for long periods.

Hence, in order to improve upon such problems, over current protection circuits operate in two ways. The first is a latch off mode, and the second is an auto recover mode. In latch off mode, the switching power supply automatically disables its output when the output end of the switching power supply shorts or is over current. It then cold-boots to try to supply power again when the output end of the switching power supply has returned to normal levels.

In auto recover mode, the over current protection circuits further operate in two detailed ways. The first is a cycle-by-cycle mode, and the second is a hiccup mode. In cycle-by-cycle mode, the switching power supply may waste energy in each operation cycle. In hiccup mode, the switching power supply automatically disables its output when the output end of the switching power supply shorts or overloads, and then automatically warm-boots to try to supply power again. The switching power supply in hiccup mode may repeatedly disable its output and automatically warm-boots until the output end of the switching power supply has returned to normal.

Hence, in order to design such previous electronic power source products such as a switching power supply, that can operate in latch off mode and auto recover mode simultaneously, users further mount more expensive controllers or combine extras with various mode circuits in electronic power source products. However, such improved products are expensive and have complex circuits.

SUMMARY OF THE INVENTION

It is the object of the present invention to provide an O.C.P and an S.C.P for a power supply.

It is another object of the present invention that the power supply can operate selectively in latch off mode or auto recover mode by replacing certain elements therein.

In order to achieve the above objects, the present invention provides an over current protection circuit for power supplies. The over current protection circuit includes: an input detection unit receiving a current sensing signal to generate an input voltage; a comparison circuit connecting to the input detection circuit and comparing the input voltage with a reference voltage to generate a compared voltage; a positive feedback sampling and maintaining unit connecting to the input detection unit and the comparison circuit and providing a first and second feedback currents based on the compared voltage; a timing circuit connecting to the comparison circuit and the positive feedback sampling and maintaining unit and determining the operation cycle of the over current protection circuit; and an output switch connecting to the timing circuit and, according to the second feedback current, determining whether the over current protection circuit restrains the outputs of the power supply.

Wherein, the first feedback current is provided to the input detection unit for further determining the period the over current protection circuit spends operating in normal mode.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

The present invention provides an over current protection circuit to offer protection for a power supply from over loading and shorting. The over current protection circuit of the present invention disables the output of the power supply during a protection period and then automatically warm-boots it. If any errors occur in the output of the power supply, the over current protection circuit disables the output of the power supply. Alternatively, if there are no errors in the output of the power supply, the over current protection circuit enables the output of the power supply.

Figure 1:
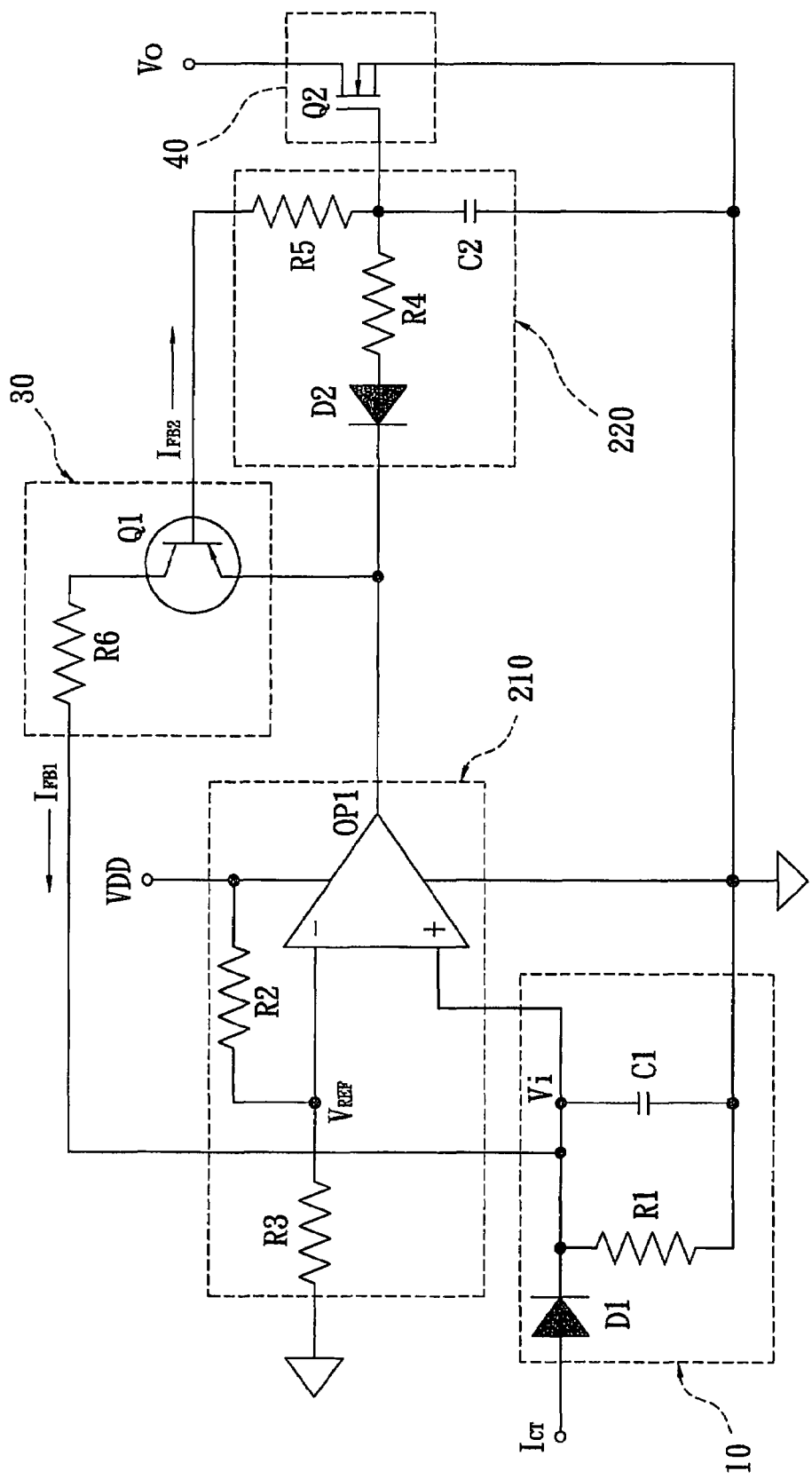
FIG. 1 is a circuit diagram of the over current protection circuit of the power supply of the present invention.

In FIG. 1, the over current protection circuit of the present invention includes a input detection unit 10, a comparison circuit 210, a timing circuit 220, a positive feedback sampling and maintaining unit 30, and an output switch 40.

The input detection unit 10 connects to the comparison circuit 210 and the output end of the power supply (not shown). The comparison circuit 210 connects to the timing circuit 220. The timing circuit 220 connects to the output switch 40. The positive feedback sampling and maintaining unit 30 connects to the input detection unit 10, the comparison circuit 210, and the timing circuit 220. The output switch 40 connects to the loading connecting to the output end of the power supply.

The input detection unit 10 includes a diode D1 and a charging and discharging circuit that includes a resistance R1 and a capacitance C1. The comparison circuit 210 includes an amplifier OP1 and two proportion resistances R2 and R3. The inverse end of the diode D1 connects to the resistance R1, the capacitance C1, and the positive input end of the amplifier OP1. The negative input end of the amplifier OP1 connects to the proportion resistances R2 and R3, wherein the proportion resistance R2 connects to a status power source VDD and the proportion resistance R3 connects to the ground. The output end of the amplifier OP1 connects to the timing circuit 220.

The timing circuit 220 includes a charging resistance R5, a discharging resistance R4, a discharging diode D2 and a capacitance C2. The positive feedback sampling and maintaining unit 30 includes a feedback transistor Q1 and a feedback resistance R6. The output switch 40 includes a transistor Q2.

The inverse end of the discharging diode D2 connects to the output end of the amplifier OP1 and the emitter end of the feedback transistor Q1. The discharging diode D2 and the discharging resistance R4 are displaced on a discharging path for the capacitance C2. One end of the capacitance C2 connects to the charging resistance R5, the discharging resistance R4, and the grain end of the transistor Q2, while the other end connects to the ground. The source end of the transistor Q2 connects to the ground, and the drain end of the transistor Q2 is the output end of the over current protection circuit.

The base end of the feedback transistor Q1 connects to the charging resistance R5 to form a charging path for the capacitance C2. The collector end of the feedback transistor Q1 connects to one end of the feedback resistance R6, and a second end of the feedback resistance R6 connects to the inverse end of the diode D1.

First, the diode D1 transmits a current sensing signal ICT of the output end of the power supply to the input detection unit 10 for further charging the capacitance C1. The charged capacitance C1 has an input voltage Vi that is the voltage level of the positive input end of the amplifier OP1. The proportion resistances R2 and R3 divide the status power source VDD to generate a resistance voltage $V_{REF}$ as the voltage level of the negative input end of the amplifier OP1.

In normal mode, that is when the input voltage Vi is less than or equal to the reference voltage $V_{REF}$, the compared voltage of the output end of the amplifier OP1 is low. Then, the output of the amplifier OP1 disables the feedback transistor Q1, and the capacitance C2 discharges into the ground through the discharging path including the discharging resistance R4 and the discharging diode D2. In this case, when the voltage level between the gate end and the source end is less than the threshold voltage in the transistor Q2, the transistor Q2 disables, and the power supply does not provide the current sensing signal $I_{CT}$ to drive the over current protection circuit.

In protection mode, that is when the input voltage Vi is greater than the reference voltage $V_{REF}$, the compared voltage of the output end of the amplifier OP1 is high. Then, the output of the amplifier OP1 enables the feedback transistor Q1. The enabled feedback transistor Q1 provides a first feedback current $I_{FB1}$ to charge the capacitance C1 via the charging resistance R6 and provides a second feedback current $I_{FB2}$ to charge the capacitance C2 via the charging resistance R5.

When the feedback transistor Q1 provides the first feedback current $I_{FB1}$ to charge the capacitance C1, the amplifier OP1 provides the positive feedback via the feedback transistor Q1 to maintain the high level output of the amplifier OP1. When the feedback transistor Q1 provides the second feedback current $I_{FB2}$ to charge the capacitance C2, the voltage level between the gate end and the source end is greater than the threshold voltage in the transistor Q2 so as to enable the transistor Q2. Hence, the over current protection circuit disables the output of the power supply, that is, the output voltage Vo of the power supply is zero.

Furthermore, when providing the second feedback current $I_{FB2}$ to charge the capacitance C2, the enabled feedback transistor Q1 operates in a saturation region and then moves to a linear region. The feedback transistor Q1 in the linear region provides the first feedback current $I_{FB1}$ to the capacitance C1 decreasingly. Then, the input voltage Vi of the amplifier OP1 becomes less than the reference voltage $V_{REF}$ so that the amplifier OP1 outputs zero. The capacitance C2 discharges into the ground via the discharging path. Finally, when the voltage level stored in the capacitance C2 is less than the threshold voltage of the transistor Q2, the transistor Q2 is cut off, and the power supply recovers. If the output current of the power supply is over, the over current protection circuit starts to operate again.

According to the above description, the feedback transistor Q1 can be a PNP-type bipolar junction transistor (BJT), the discharging resistance R4 can be a tunable resistance, and the transistor Q2 can be an N-type field effect transistor (FET).

Figure 2:
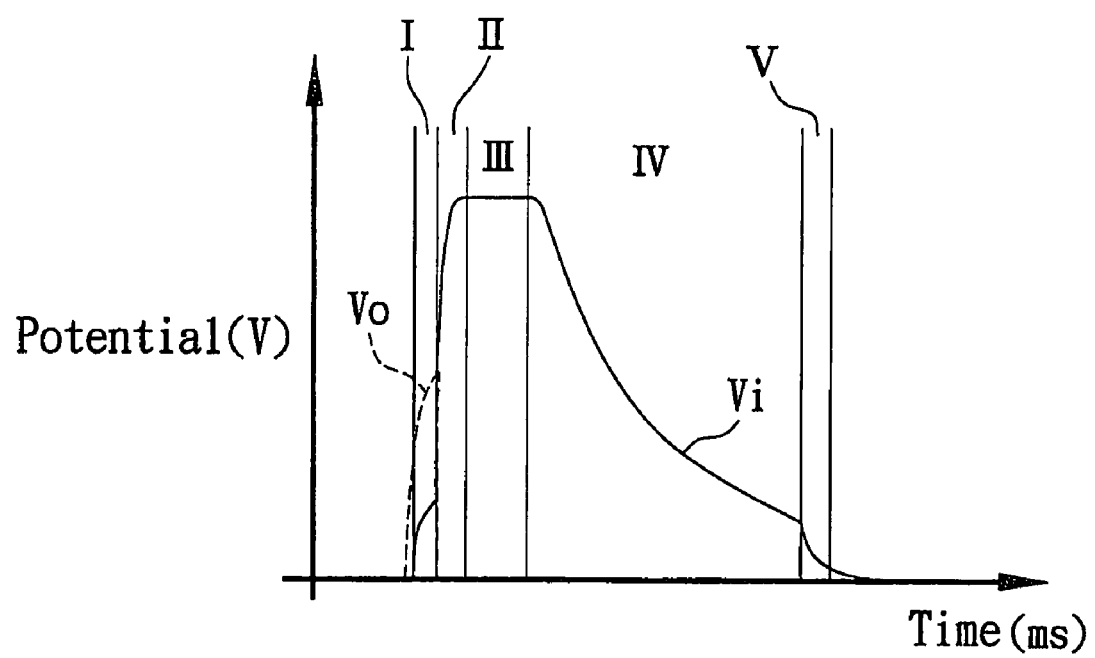
FIG. 2 is a waveform diagram of the input voltage of the amplifier of the over current protection circuit of the present invention.

In FIG. 2, a waveform diagram of the input voltage Vi of the amplifier OP1 of the over current protection circuit of the present invention is shown. The output voltage Vo of the over current protection circuit is shown as a dot-line curve. The input voltage Vi of the amplifier OP1 is shown as a real-line curve, wherein the characteristic curve of the input voltage Vi has five stages (the first stage I, the second stage II, the third stage III, the fourth stage IV, and the fifth stage V).

Figure 3:
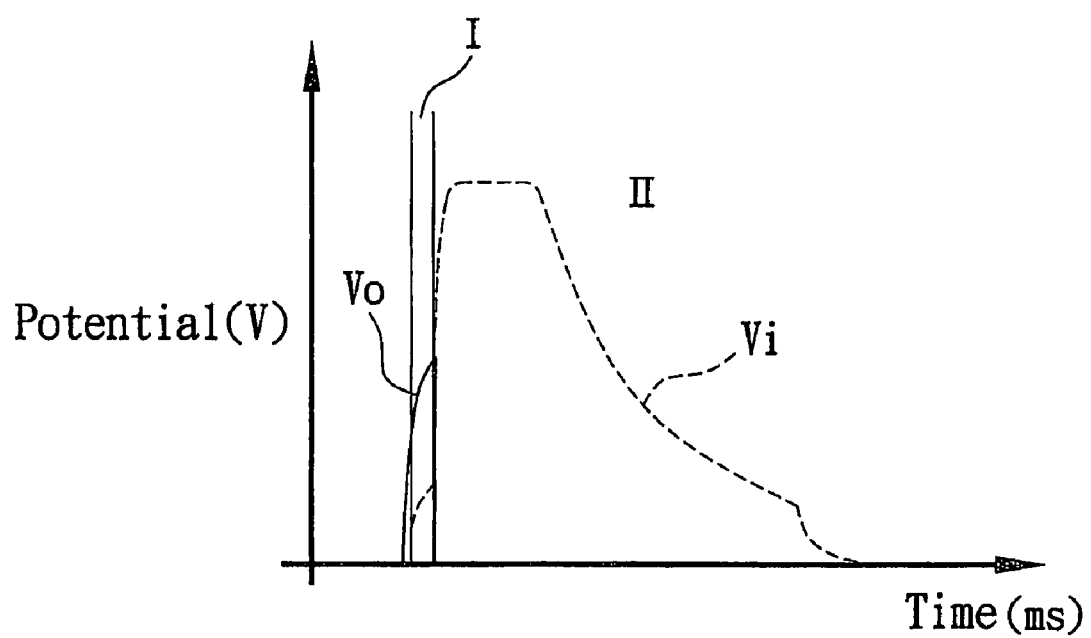
FIG. 3 is a waveform diagram of the output voltage of the transistor of the over current protection circuit of the present invention.

The first stage I illustrates that the capacitance C1 is charged by the current sensing signal $I_{CT}$. The second stage II illustrates the voltage stored in the capacitance C1 in self-holding mode. The third stage III illustrates the maximum input voltage Vi of the amplifier OP1. The fourth stage IV illustrates the voltage stored in the capacitance C1 during the feedback transistor Q1 operating in linear region. The fifth stage V illustrates that the capacitance C1 discharges fast when the input voltage Vi is less than the reference voltage In FIG. 3, a waveform diagram of the output voltage Vo of the transistor Q2 of the over current protection circuit is shown. The input voltage Vi of the amplifier OP1 is shown as a dot-line curve. The output voltage Vo of the over current protection circuit is shown as a real-line curve, wherein the characteristic curve of the output voltage Vo has two stages (the first stage I and the second stage II). The first stage I illustrates the output voltage Vo in normal mode. The second stage II illustrates the output voltage Vo in over current protection mode.

Figure 4:
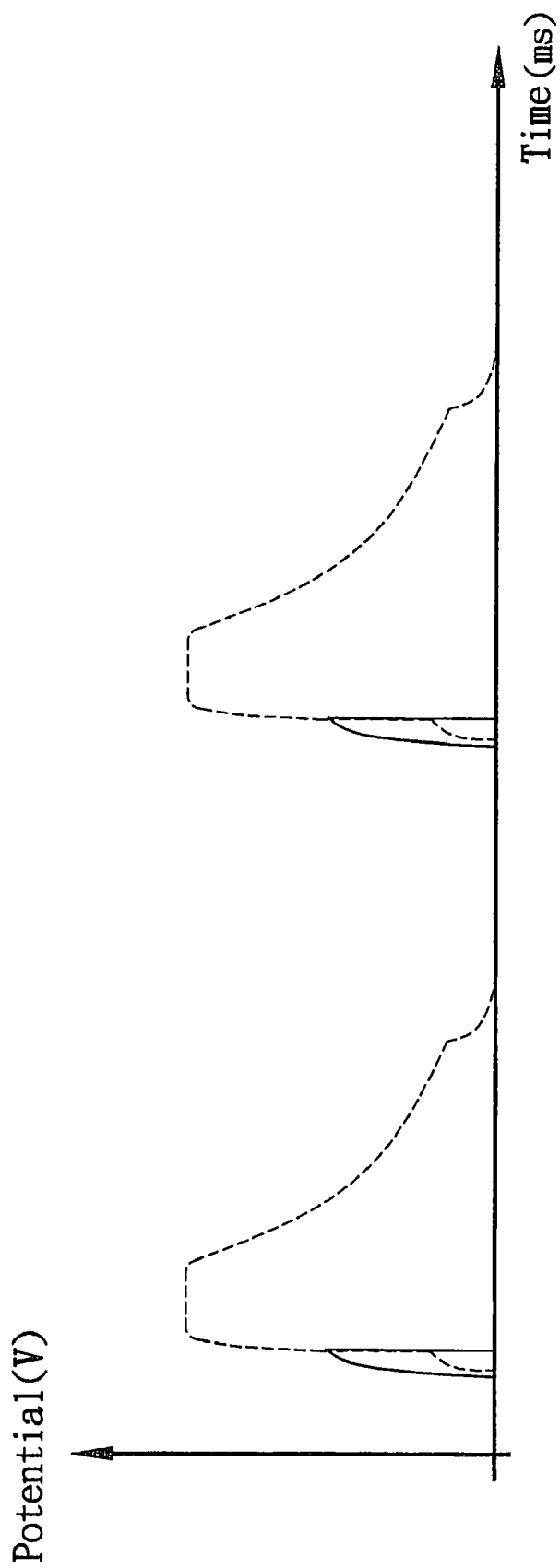
FIG. 4 is a curve diagram of the operation cycle of the over current protection circuit of the present invention.

According to the above description, the over current protection circuit can adjust the discharging period of the capacitance C2 based on the discharging resistance R4 so as to adjust the delay period for entering the over current protection mode. The power supply can directly obtain the output voltage Vo from the output switch 40 without amplifying. In FIG. 4, a curve diagram of the operation cycle of the over current protection circuit of the present invention is shown.

The over current protection circuit in FIG. 1 can execute the hiccup mode in the auto recover mode. If replacing some element of the over current protection circuit in FIG. 1, such an over current protection circuit will be able to execute the latch off mode.

Figure 5:
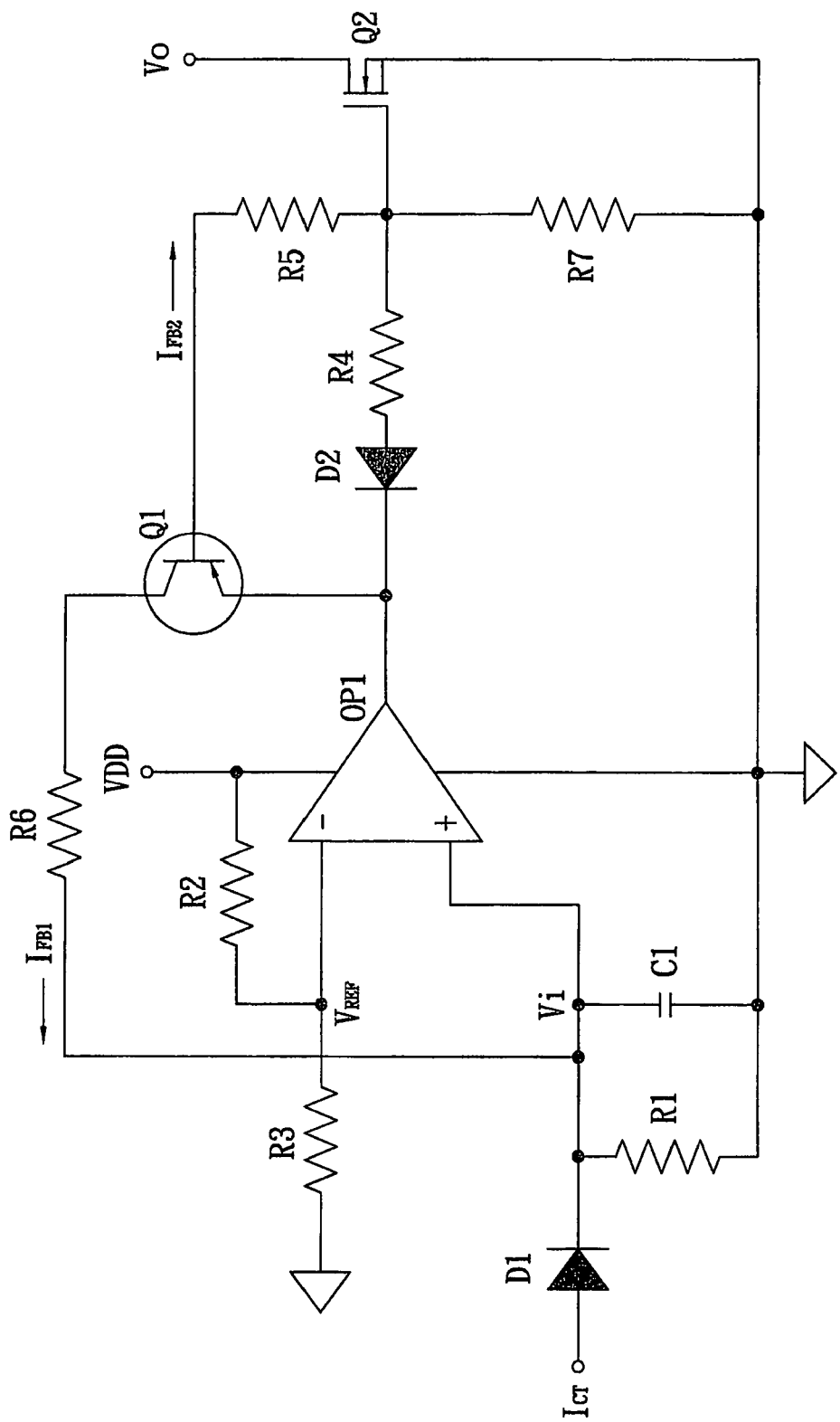
FIG. 5 is a circuit diagram of another embodiment of the over current protection circuit of the present invention.

In FIG. 5, the present invention uses a division resistance R7 to replace the capacitance C2 in FIG. 1, and the division resistance R7 and the charging resistance R5 can be combined to form a voltage division unit. Hence, the over current protection circuit in FIG. 5 can execute the latch off mode.

An advantage of the present invention is that the present invention uses the charging and discharging circuit to control the operation cycle of the over current protection circuit.

Another advantage of the present invention is that it uses the positive feedback circuit to control the charging and discharging circuit.

Another advantage of the present invention is that it uses the compared voltage outputted by the comparison circuit, to control the positive feedback circuit.

Yet another advantage of the present invention is that it can execute the latch mode and the auto recover mode by replacing certain elements.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. An over current protection circuit for a power supply, comprising:
    an input detection unit receiving a current sensing signal to generate an input voltage;
    a comparison circuit connecting to the input detection circuit and comparing the input voltage with a reference voltage to generate a compared voltage;
    a positive feedback sampling and maintaining unit connecting to the input detection unit and the comparison circuit and providing a first and a second feedback current based on the compared voltage, wherein the first feedback current is provided to the input detection unit for further determining the period the over current protection circuit spends operating in normal mode;
    a timing circuit connecting to the comparison circuit and the positive feedback sampling and maintaining unit and determining the operation cycle of the over current protection circuit; and
    an output switch connecting to the timing circuit and according to the second feedback current determining whether the over current protection circuit restrains the outputs of the power supply.

2. The over current protection circuit according to claim 1, wherein the input detection unit comprises a diode, a resistance, and a capacitance, and the resistance and the capacitance are used for determining the input voltage and controlling the period the over current protection circuit spends returning to normal.

3. The over current protection circuit according to claim 1, wherein the timing circuit comprises a charging path and a discharging path, the positive feedback sampling and maintaining unit charges the timing circuit based on the charging path, and the timing circuit discharges into the comparison circuit and the positive feedback sampling and maintaining unit based on the discharging path.

4. The over current protection circuit according to claim 3, wherein the charging path includes a capacitance connecting to the ground, and a charging resistance connecting to the positive feedback sampling and maintaining unit.

5. The over current protection circuit according to claim 4, wherein the discharging path includes a discharging diode, a discharging resistance and the capacitance, the discharging resistance respectively connects to the comparison circuit and the positive feedback sampling and maintaining unit according to the discharging diode.

6. The over current protection circuit according to claim 1, wherein the comparison circuit includes an amplifier and two proportion resistances.

7. The over current protection circuit according to claim 1, wherein the positive feedback sampling and maintaining unit includes a feedback transistor and a feedback resistance, the feedback transistor connects to the timing circuit and the comparison circuit and via the feedback resistance connects to the input detection unit to control the timing circuit.

8. The over current protection circuit according to claim 1, wherein the output switch includes a transistor.

9. An over current protection circuit for a power supply, comprising:
    an amplifier comparing the voltage level of a negative input end of the amplifier with the voltage level of a positive input end of the amplifier to generate a compared voltage of a output end of the amplifier;
    a feedback transistor connecting to the output end of the amplifier and according to the compared voltage providing a first feedback current and a second feedback current;
    a timing circuit connecting to the feedback transistor and the output end of the amplifier and according to the second feedback current determining the operation cycle of the over current protection circuit; and
    an output switch connecting to the timing circuit and according to the second feedback current determining whether to disable the output of the power supply.

10. The over current protection circuit according to claim 9, wherein the over current protection circuit further comprises a diode and a charging and discharging circuit, the power supply provides a current sensing signal and the first feedback current to charge the charging and discharging circuit via the diode for further providing the voltage level of the positive input end of the amplifier.

11. The over current protection circuit according to claim 9, wherein the negative input end of the amplifier has a reference voltage generated by dividing a state power source via two proportion resistances.

12. The over current protection circuit according to claim 9, wherein the timing circuit includes a charging path and a discharging path, the feedback transistor charges the timing circuit based on the charging path, and the timing circuit discharges into the ground of the amplifier based on the discharging path.

13. The over current protection circuit according to claim 12, wherein the charging path is disposed with a capacitance connecting to the feedback transistor, and a charging resistance connecting to the ground.

14. The over current protection circuit according to claim 13, wherein the discharging path is disposed with a discharging diode and a discharging resistance and the capacitance, the discharging resistance connects to the feedback transistor and the output of the amplifier via the discharging diode.

15. The over current protection circuit according to claim 9, wherein the output switch comprises a transistor.

16. An over current protection circuit for a power supply, comprising:
    an amplifier comparing the voltage level of a negative input end of the amplifier with the voltage level of a positive input end of the amplifier to generate a compared voltage;
    a feedback transistor connecting to an output end of the amplifier and providing a first feedback current and a second feedback current based on the compared voltage;
    a voltage division unit connecting to the feedback transistor and the output of the amplifier and dividing voltage according to the second feedback current; and
    an output switch connecting to the voltage division unit for determining whether to disable the output of the power supply according to dividing voltage.

17. The over current protection circuit according to claim 16, further comprising a diode and a charging and discharging circuit that is charged by the first feedback current and a current sensing signal provided by the power supply via the diode, and the charged charging and discharging circuit supplies voltage to the positive input end of the amplifier.

18. The over current protection circuit according to claim 16, wherein the voltage division unit comprises two proportion resistances that divide a status power source for further generating a resistance voltage that is the voltage level of the output of the amplifier.

19. The over current protection circuit according to claim 16, wherein the output switch comprises a transistor.

* * * * *